(12) United States Patent
Stedron et al.

(10) Patent No.: US 6,398,903 B1
(45) Date of Patent: Jun. 4, 2002

(54) METHOD FOR APPLYING AN EDGE PROTECTOR TO A PLATE MADE OF A BRITTLE MATERIAL, SUCH AS GLASS OR A GLASS-CERAMIC MATERIAL, IN PARTICULAR A COOKING SURFACE

(75) Inventors: Horst Stedron, Herhorn; Michael Muskalla, Mainz; Bernd Schulteis, Schwabenheim; Inka Henze, Udenheim, all of (DE)

(73) Assignee: Schott Glass, Mainz (DE)

( * ) Notice: Subject to any disclaimer, the term of this patent is extended or adjusted under 35 U.S.C. 154(b) by 0 days.

(21) Appl. No.: 09/506,264

(22) Filed: Feb. 17, 2000

(30) Foreign Application Priority Data

Feb. 17, 1999 (DE) .......................... 199 06 490

(51) Int. Cl.⁷ ................................. B32B 3/26
(52) U.S. Cl. ..................... 156/305.5; 156/289; 156/293; 156/304.2; 156/304.4
(58) Field of Search ............... 428/192, 223, 428/194, 195, 196; 156/304.2, 304.4, 293, 284, 305.5

(56) References Cited

FOREIGN PATENT DOCUMENTS

| DE | 33 41 191 | | 6/1985 |
|---|---|---|---|
| DE | 3341191 | * | 6/1985 |
| DE | 35 16 452 A1 | | 11/1986 |
| DE | 32 05 113 | | 8/1993 |
| DE | 197 03 270 A1 | | 8/1998 |
| DE | 197 03 542 | | 8/1998 |
| DE | 19703542 | * | 8/1998 |

* cited by examiner

*Primary Examiner*—Merrick Dixon
(74) *Attorney, Agent, or Firm*—Pauley Peterson Kinne & Erickson

(57) ABSTRACT

A method for applying an edge protector to a plate made of a brittle material, such as glass or a glass-ceramic or ceramic material, in particular a cooking surface. The edge protector can be applied to a plate made of a brittle material without expensive tools and without prefabricated frame elements because the plate is positioned, with the top leading, in a lower tool element, and an upper tool element is placed on the lower tool element with the positioned plate. A hollow space, which is open toward the top of the upper tool element and defines the shape of the edge, is delimited by the lower tool element and the upper tool element in the area of the edge of the plate. A cold-setting sealing compound is metered into the hollow space, and the plate, together with the edge protector, is removed from the tool following the setting of the sealing compound.

10 Claims, 1 Drawing Sheet

METHOD FOR APPLYING AN EDGE PROTECTOR TO A PLATE MADE OF A BRITTLE MATERIAL, SUCH AS GLASS OR A GLASS-CERAMIC MATERIAL, IN PARTICULAR A COOKING SURFACE

BACKGROUND OF THE INVENTION

1. Field of the Invention

This invention relates to a method for applying an edge protector to a plate made of a brittle material, such as glass or a glass-ceramic or ceramic material, in particular a cooking surface.

2. Description of Related Art

In connection with cooking surfaces, in particular, it is important to protect a circumferential edge against damages, since this edge is particularly sensitive to mechanical stresses. If the edge of a plate made of a brittle material, such as glass or a glass-ceramic or a ceramic material, is badly or not at all treated, the mechanical stressing capability of the edge is reduced because of the poor condition of the surface.

Various steps for protecting the edges of such plates against breakage, cracks and indentations are already known.

As shown in German Patent Reference DE 33 41 191 A1, it is known to protect a cooking surface circumferentially with a metal frame, which is connected via a flowable sealing material with the cooking surface. The sealing material is extruded into a hollow space formed between the metal frame and the cooking surface, with the aid of sealing bars.

A two-component adhesive is preferably used as the sealing material, which is introduced under pressure into the hollow space and sets under the effect of heat.

By this method, manual gluing of the cooking surface into the metal frame is replaced by a work step which can be performed automatically, and which makes manufacture of the edge protector simple and cheaper.

However, this method still requires prefabricated metal frames, which are produced in an extrusion process with elaborate, pressure-resistant tools and require a pressure-resistant closure of the hollow spaces in the area of the edge of the plate.

It is also known to provide plates made of glass with an extruded frame of a thermoplastic material. Again, a high-cost tool is required because it must resist the high extrusion pressure. Furthermore, this extruded part has only the function of a metal frame, no elastic framing of the plate can thus be provided, unless silicon caoutchouc or PUR are used as the materials.

It is also known to produce the edge protector for a cooking surface by means of a directly foamed-on frame made of a plastic reaction foam, as shown by German Patent Reference DE 197 03 542 A1. Here, too, a closed tool is required, which must withstand the pressure occurring in the course of the reaction. Moreover, an appropriate setting time is required.

SUMMARY OF THE INVENTION

It is one object of this invention to provide a method of the type mentioned above, which does not require a prefabricated expensive frame and an elaborate pressure-resistant tool.

This object is achieved in accordance with this invention because a plate is positioned, with a top leading, in a lower tool element, and an upper tool element is placed on the lower tool element with the positioned plate. A hollow space, which is open toward the top of the upper tool element and defines the shape of the edge protector, is delimited by the lower tool element and the upper tool element in the area of the edge of the plate. A cold-setting sealing compound is metered into the hollow space, and the plate, together with the edge protector, is removed from the tool following the setting of the sealing compound.

By this manner of positioning the plate in the lower tool element, the edge protector is definitely delimited in its shape and fixed in the visible area, such as the top, of the plate. Because the back of the plate is normally not visible, something which is the case with cooking surfaces, the tool with the hollow space formed for the edge protector can be open toward that side.

The sealing compound can be metered in from this side. Because the sealing compound sets while it is cold, the tool need not be pressure-resistant, particularly since compensation openings are provided toward the top of the upper tool element. Moreover, a smooth edge protector is achieved in the visible area of the plate, and thus a porous appearance of the surface, such as in connection with a reaction foam material, is avoided.

Because of the open design of the tool, the method of this invention permits the employment of epoxy resins, hard woods or aluminum for the construction of the tool, which considerably reduces the production times for the latter, which in particular is a result of the sealing compound being introduced into the tool almost without pressure.

In accordance with one embodiment and depending on the use of the plate, it is possible to provide a low-viscosity sealing compound, such as polyurethane (PUR), silicon, epoxy resins or polyester, which is used for a permanently elastic edge protector. Low-melting metals, for example aluminum, are used for a shock-resistant edge protector, provided the casting tool is appropriately temperature-resistant.

Positioning of the plate in the lower tool element can be easier and improved because the plate is supported in the lower tool element in the area of the edge with a circumferential sealing element. Thus the hollow space is delimited toward the top and/or the edge of the plate. Moreover, damage to the plate at the support points of the tool are no longer a problem.

The same applies to the upper tool element if it is supported with a circumferential sealing element on an underside of the plate at a distance from the edge of the latter, by means of which the hollow space, and therefore the width of the edge protector, are delimited on the underside of the plate.

Since, following metering of the sealing compound, the unset edge protector is still accessible through the open upper tool element, it is possible to embed fastening elements, such as assembly aids, in the sealing compound introduced into the hollow space.

BRIEF DESCRIPTION OF THE DRAWINGS

This invention will be explained in greater detail by means of exemplary embodiments represented in the drawings, wherein.

DETAILED DESCRIPTION OF PREFERRED EMBODIMENTS

Figure 1:
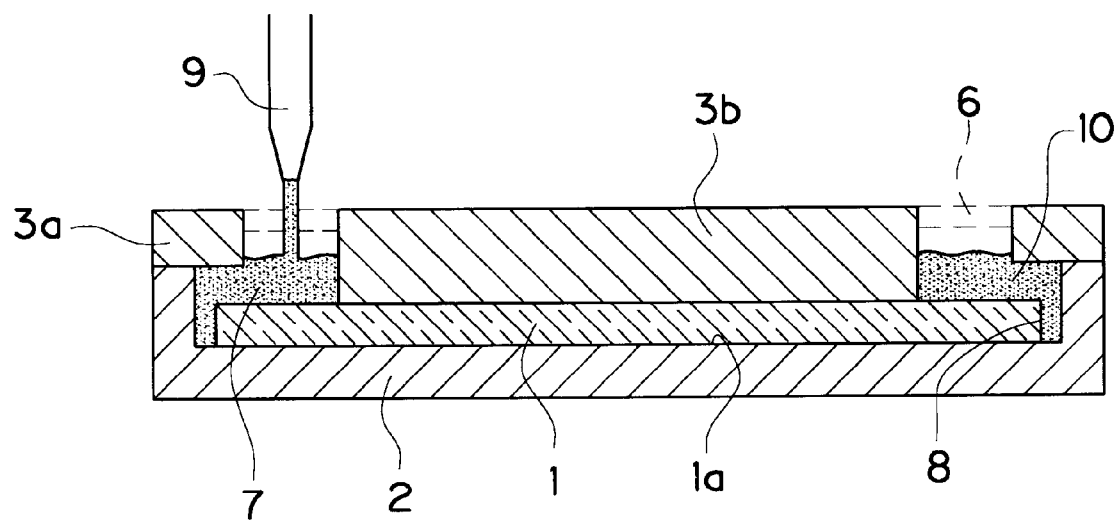
FIG. 1 is a partial sectional view of a tool for a method in accordance with this invention, wherein a lower tool element and an upper tool element define a hollow space for an edge protector and position the plate.

As shown in FIG. 1, a top or visual side 1a of a plate 1 is inserted into a tub-shaped lower tool element 2 so that its edge 8 is positioned all around at a uniform distance from the lateral walls of the lower tool element 2. In this case a large surface of the plate 1 rests on the bottom of the lower tool element 2.

The tool is complemented by means of an upper tool element comprising the partial areas 3a and 3b. Above the edge protector 10 to be produced, which is defined by the hollow space 7 delimited between the lower tool element 1 and the upper tool element, the partial areas 3a and 3b are only connected with each other by means of strips 6, so that a tool is formed which is open toward a top.

Once the plate 1 is positioned in the lower tool element 2, and the upper tool element with the partial areas 3a and 3b is placed in the correct position on the lower tool element 2, a cold-setting low-viscosity sealing compound can be metered into the hollow space 7, as the sketched-in metering device 9 shows. Since the sealing compound can arbitrarily extend into the hollow space area between the partial areas 3a and 3b of the upper tool element, metering of the sealing compound is not critical. As a rule, this portion of the edge protector 10 is not visible, such as in a cooking surface. In the area of the top, or visible side 1a, of the plate 1, the edge protector 10 terminates flush and has a smooth surface.

Following setting of the sealing compound, the plate 1 with the edge protector 10 is taken out of the tool.

Since the sealing compound can be metered in under almost no pressure, the lower tool element 2 and the upper tool element 3a, 3b can be made quickly and cost-effectively of a cheap material which is not pressure-resistant, such as an epoxy resin, hard wood and aluminum.

PUR, silicon, polyester, epoxy resins or metals with low melting points, such as aluminum, for example, can be used. This depends on the material selection and use of the plate 1 with the edge protector 10.

Figure 2:
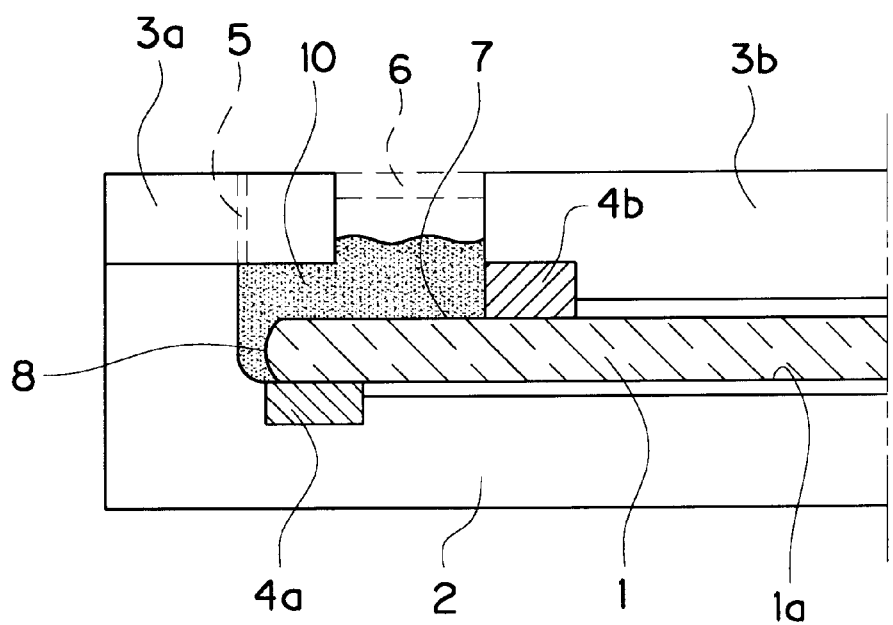
FIG. 2 is a partial sectional view of a tool for the method in accordance with this invention, wherein the lower tool element and the upper tool element have additional sealing elements which, in connection with the lower tool element, define the hollow space for the edge protector and position the plate.

In one preferred embodiment in accordance with FIG. 2, the edge 8 of the plate 1 is curved outward, and the plate 1 does not rest directly on the tool. The lower tool element 2 and the partial area 3b have sealing elements 4a and 4b, on which the plate 1 is supported all around by its plate edge. Here, the sealing element 4a also delimits the hollow space 7 in the area of the top, or respectively visible side 1a, past the edge 8, so that the edge protector 10 meets flush with the top 1a of the plate 1.

The sealing element 4b in the partial area 3b of the upper tool element delimits the hollow space 7 on the rear of the plate 1, and in this way determines the width of the edge protector 10. A ventilating slit 5 is provided in the partial area 3a of the upper tool element.

Because the sealing elements 4a and 4b support the plate 1 in the tool, the plate is not in contact with the lower tool element 2 and the partial area 3b of the upper tool element. In this way the plate 1 is positioned safe from damage.

The sealing compound is metered in through the open side of the upper tool element, such as through the openings between the partial areas 3a and 3b of the upper tool element formed by the strips 6.

The application of the edge protector 10 on the plate 1 is performed by means of the same process step as in the case of the use of a tool in accordance with FIG. 1.

It has been shown to be particularly advantageous if a cooking surface has such an edge protector 10.

We claim:

1. In a method for using a tool to apply an edge protector to a plate made of a brittle material, in particular a cooking surface, the improvement comprising:

positioning the plate with a top leading in a tower tool element, placing an upper tool element on the lower tool element with the positioned plate, the upper tool element and the lower tool element forming a hollow space open toward the top of the upper tool element and defining a shape of the edge protector which is delimited by the lower tool element and the upper tool element in an area of an edge of the plate, metering a cold-setting sealing compound into the hollow space, and removing the plate and the edge protector from the upper tool element and the lower tool element after a setting of the sealing compound.

2. In the method in accordance with claim 1, wherein the sealing compound is introduced with almost no pressure into the hollow space.

3. In the method in accordance with claim 1, wherein a low-viscosity sealing compound is used as a permanently elastic edge protector.

4. In the method in accordance with claim 1, wherein a metal with a low melting point is used for a shock-resistant edge protector.

5. In the method in accordance with claim 4, wherein the plate is supported in the lower tool element in the area of the edge by a circumferential sealing element, and the hollow space is delimited toward at least one of the top and the edge of the plate.

6. In the method in accordance with claim 5, wherein the upper tool element is supported by a circumferential sealing element on an underside of the plate at a distance from the edge of the plate and the hollow space, and a width of the edge protector is delimited on the underside of the plate.

7. In the method in accordance with claim 6, wherein a plurality of fastening elements are embedded in the sealing compound introduced into the hollow space.

8. In the method in accordance with claim 1, wherein the plate is supported in the lower tool element in the area of the edge by a circumferential sealing element, and the hollow space is delimited toward at least one of the top and the edge of the plate.

9. In the method in accordance with claim 1, wherein the upper tool element is supported by a circumferential sealing element on an underside of the plate at a distance from the edge of the plate and the hollow space, and a width of the edge protector is delimited on the underside of the plate.

10. In the method in accordance with claim 1, wherein a plurality of fastening elements are embedded in the sealing compound introduced into the hollow space.

* * * * *